G. E. LOCKWOOD.

CAN SOLDERING MACHINE.

No. 11,297. Reissued Dec. 27, 1892.

WITNESSES:

L. Douville,

Wm. C. Wiedersheim.

INVENTOR

George E. Lockwood

By John C. Wiedersheim.

ATTORNEY.

G. E. LOCKWOOD.
CAN SOLDERING MACHINE.
No. 11,297. Reissued Dec. 27, 1892.
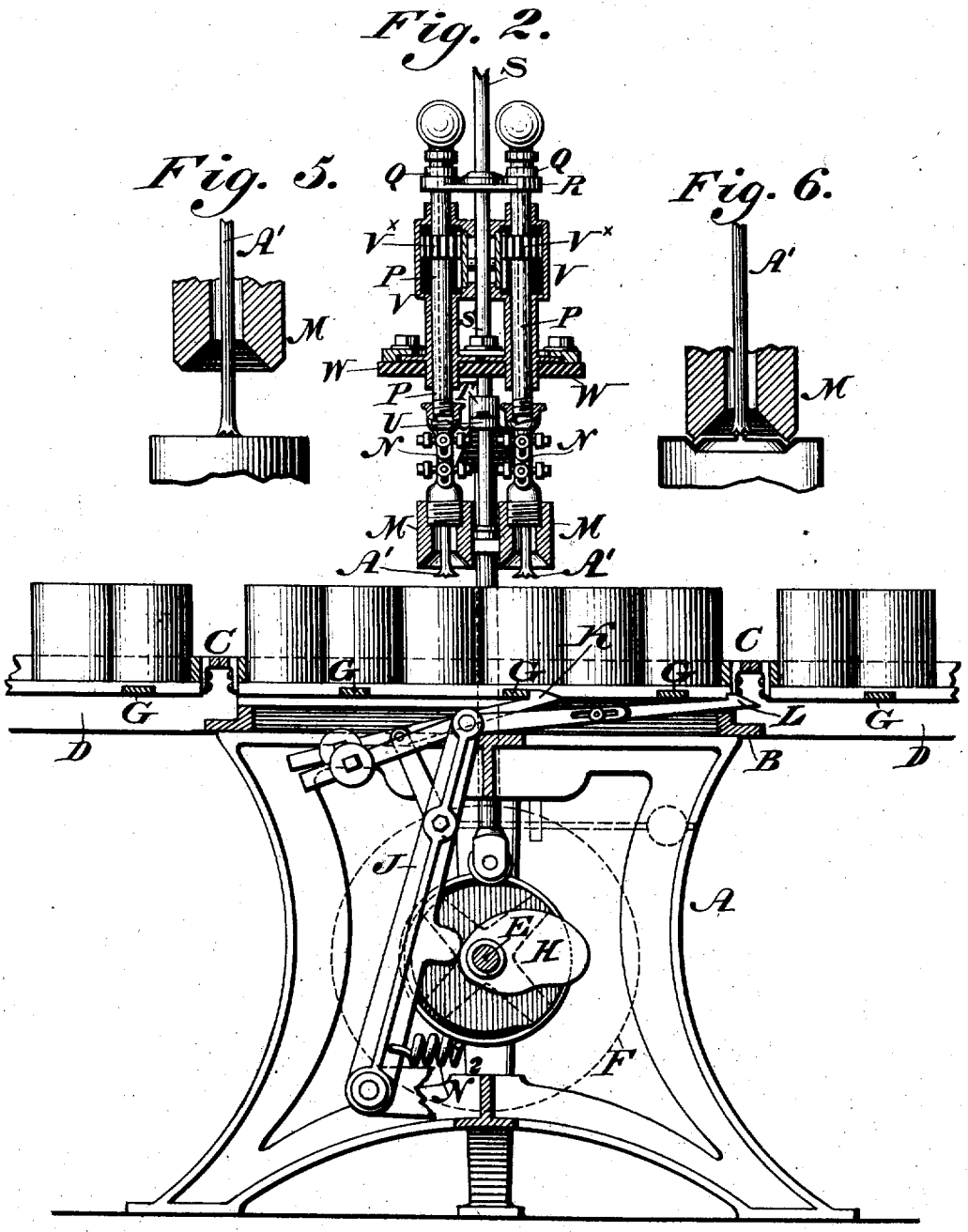
WITNESSES:
L. Douville,
Wm. C. Wiedersheim
INVENTOR
George E. Lockwood
BY Louis Wiedersheim
ATTORNEY.

G. E. LOCKWOOD.
CAN SOLDERING MACHINE.
No. 11,297. Reissued Dec. 27, 1892.
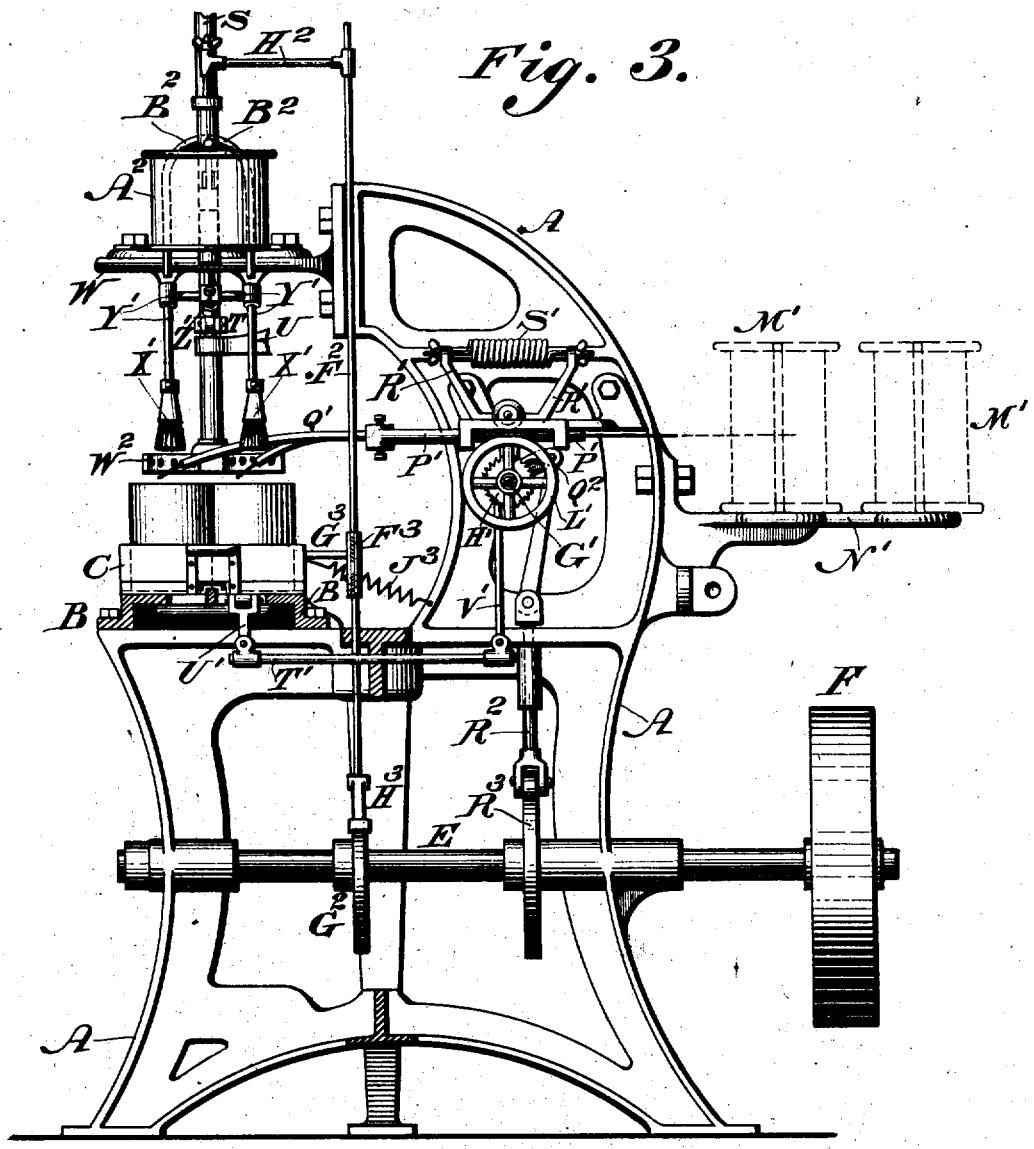
WITNESSES:
L. Douville,
Wm. C. Wiedersheim.
INVENTOR
George E. Lockwood
BY Jno. A. Wiedersheim
ATTORNEY.

G. E. LOCKWOOD.

CAN SOLDERING MACHINE.

No. 11,297. Reissued Dec. 27, 1892.

WITNESSES:

L. Douville,

Wm. C. Wiedersheim.

INVENTOR,

George E. Lockwood

BY Joshua Wiedersheim

ATTORNEY.

G. E. LOCKWOOD.

CAN SOLDERING MACHINE.

No. 11,297. Reissued Dec. 27, 1892.

WITNESSES:

L. Douville,

Wm. E. Wiedersheim.

INVENTOR

George E. Lockwood

BY

John A. Wiedersheim

ATTORNEY.

G. E. LOCKWOOD.

CAN SOLDERING MACHINE.

No. 11,297. Reissued Dec. 27, 1892.

WITNESSES:

L. Douville,

Wm. C. Wiedersheim.

INVENTOR

George E. Lockwood.

BY Wm. C. Wiedersheim

ATTORNEY.

UNITED STATES PATENT OFFICE.

GEORGE E. LOCKWOOD, OF PHILADELPHIA, PENNSYLVANIA, ASSIGNOR TO GEORGE H. COLKET, OF SAME PLACE.

CAN-SOLDERING MACHINE.

SPECIFICATION forming part of Reissued Letters Patent No. 11,297, dated December 27, 1892.

Original No. 443,289, dated December 23, 1890. Application for reissue filed November 12, 1892. Serial No. 451,841.

*To all whom it may concern:*

Be it known that I, GEORGE E. LOCKWOOD, a citizen of the United States, residing in the city and county of Philadelphia, State of Pennsylvania, have invented a new and useful Improvement in Can Capping or Soldering Machines, which improvement is fully set forth in the following specification and accompanying drawings.

My invention relates to improvements in can-capping or soldering machines; and it consists, first, of mechanism, substantially as described, for uniformly advancing a train of can-trays on the table of the machine; second, of an automatic solder-feeding device; third, of mechanism, substantially as described, for intermittingly operating said solder-feeding mechanism; fourth, of an automatic acid-feeding device; fifth, of heating mechanism for the capping-irons movable therewith, substantially as described; sixth, of the combination of parts herein described.

Figure 1:
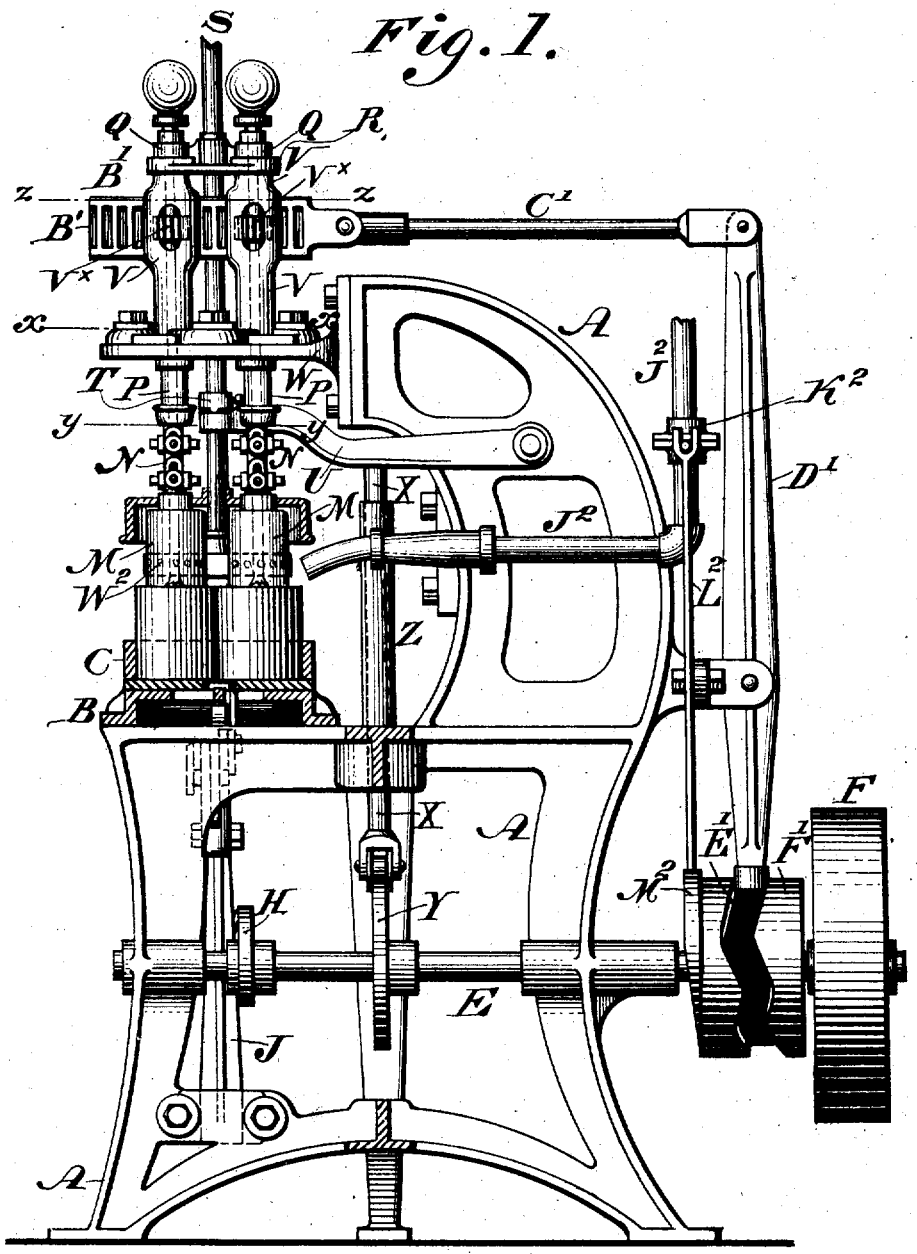
Figures 4, 7:
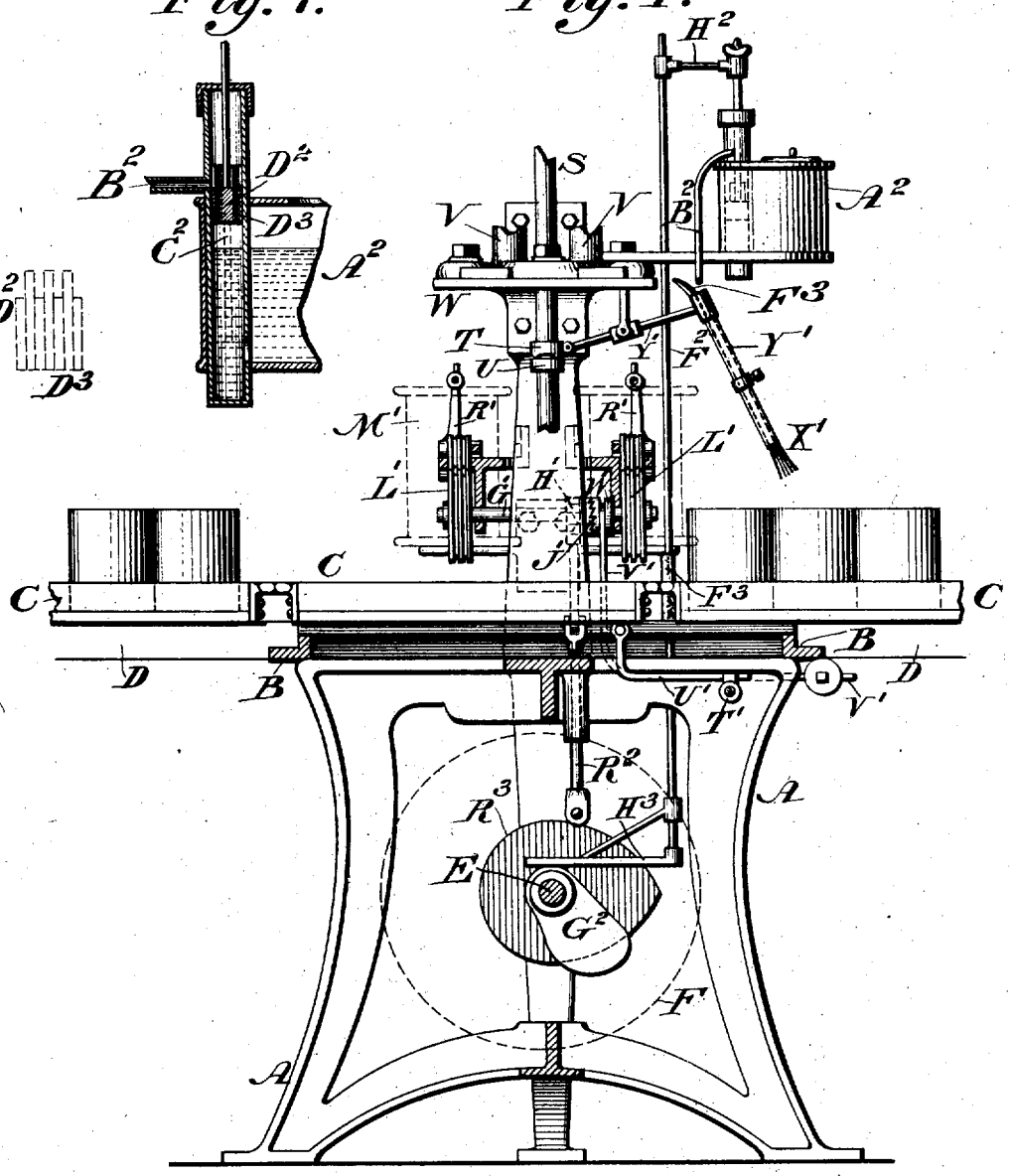
Figure 8:
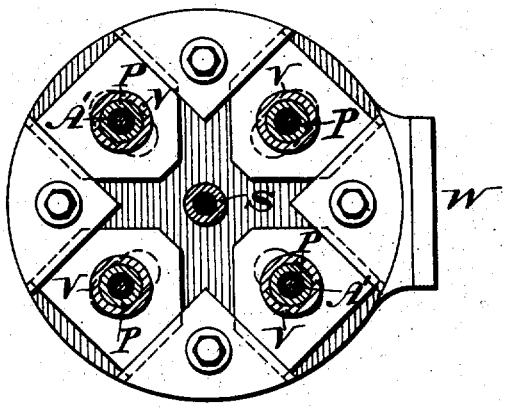
Figure 11:
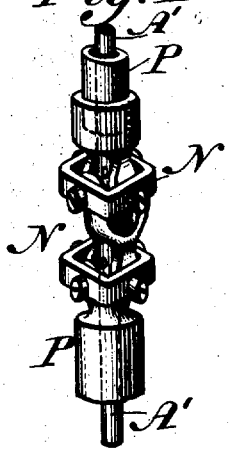
Figure 9:
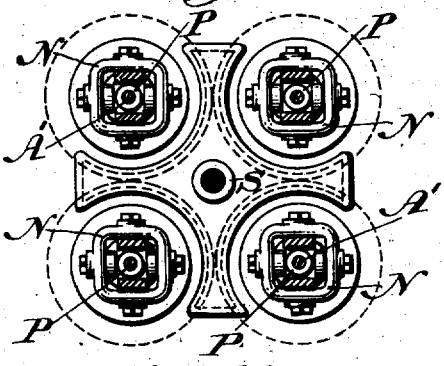
Figure 12:
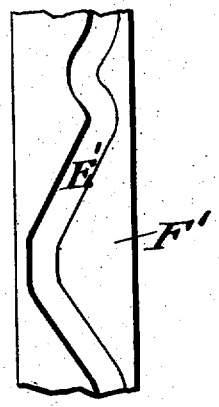
Figure 10:
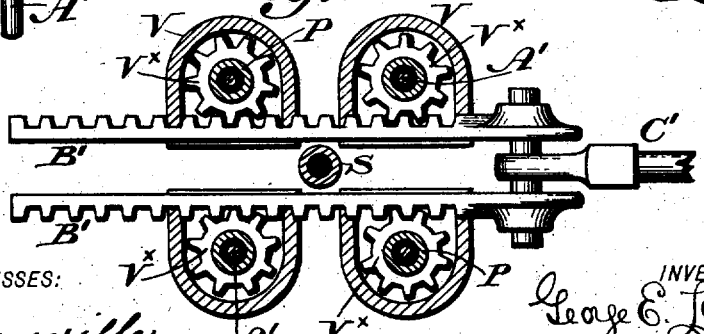
Figure 13:
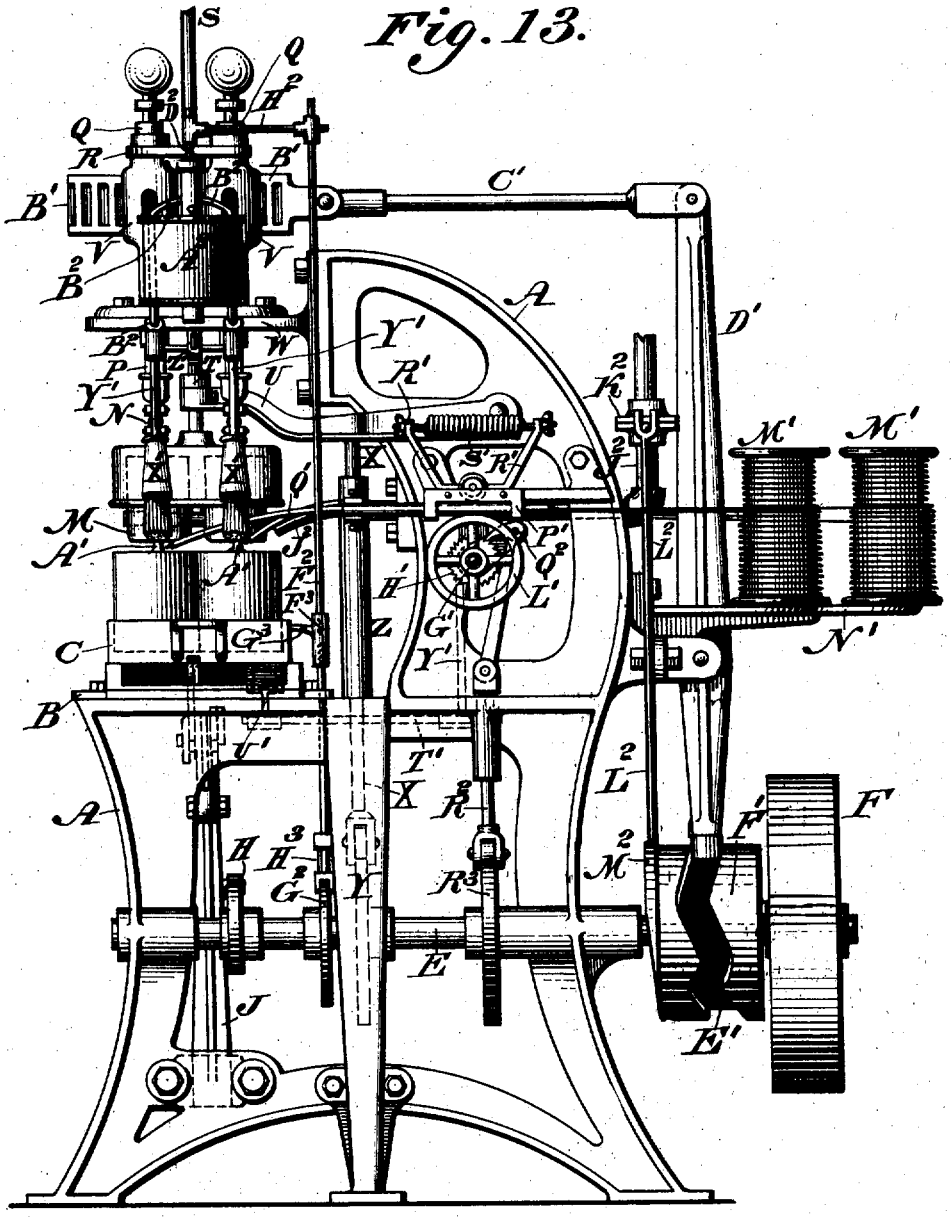

Figure 1 represents a sectional elevation of a portion of the machine, showing a section of the frame with driving-shaft and capping-irons, and mechanism for operating the latter. Fig. 2 represents a sectional view in elevation of the same parts at a right angle to the view shown in Fig. 1, at a different stage of the operation. Fig. 3 represents an end view showing the solder and the acid feeding devices. Fig. 4 represents a view of the parts shown in Fig. 3, at right angles to that shown in the said figure. Figs. 5 and 6 represent detail sectional views of a capping-iron and side views of a weighted tip-rod at different times of operation. Fig. 7 represents a sectional view, on an enlarged scale, of the valve mechanism of the acid-tank, the dotted lines on the left showing the plunger-head enlarged. Figs. 8, 9, and 10 represent horizontal sections of the capping-iron-operating mechanism on lines *x*, *x*, *y*, *y*, and *z*, *z*, respectively, Fig. 1, on an enlarged scale. Fig. 11 represents a perspective view of the universal-joint attachment for the capping-iron. Fig. 12 represents a sectional view of the periphery of the grooved cam-pulley for operating the capping-iron mechanism. Fig. 13 represents an end view of the machine embodying the invention.

Similar letters of reference indicate corresponding parts in the several figures.

Referring to the drawings:—A designates the frame of the machine, having a bed portion B, on which the can-trays C travel. The table B may be extended by connecting thereto the sections D, suitably supported, so as to sustain a number or train of the trays, the said table portion and sections having rollers thereon on which the trays move.

Journaled in the lower portion of the frame is a driving shaft E, which receives rotary motion from a suitable motor by means of a band-pulley F.

The trays C are provided with projecting pieces G, affording bearings for operating-levers.

On the shaft E is a cam H, adapted to come in contact with and oscillate a lever J, pivoted at its lower end to the frame A, and having pivoted thereon at different distances from its pivotal connection with the frame two balanced levers K, L, each of which has hooked ends adapted to engage the projections G of the trays, so as to advance the same on the table. It will be seen that the hooked ends of the levers K, L, travel different distances during each movement of the lever J, thereby permitting the longer lever, which moves the greatest distance, to engage the first projection of each tray, thus allowing for the thickness of the two walls at the ends of the two trays between the cams, the other lever, however, aiding in the movement by engaging the last projection of the preceding tray near the end of the movement, so as to prevent a jarring of the trays.

M designates the capping-irons, which in the machine shown in the drawings are four in number, but which may be six or more, if desired. Each of these irons has a universal-joint connection N with a hollow spindle P, which is provided at or near its upper end with a collar Q, which bears upon a yoke R, carried by the hollow tube or pipe S. The said pipe S is supported by means of an adjustable collar T, which is secured thereon on the pivoted lever U, so as to be raised or lowered by the oscillation of the same. The spindles P move in the vertical sleeves V, which are secured to the projection W of the frame A. To raise and lower the said lever U, a rising and falling rod X is provided, having its upper end in contact with said lever U, and its lower end provided with a roller which rides on a cam Y on the shaft E. A guide-tube Z, secured to the frame A, incloses a portion of the rod X. Within the spindles are the weighted tip-irons A′, each having a flaring serrated lower end to securely hold the cap in place during the soldering and cooling.

To give a partial rotary oscillating motion to the capping-irons, the portion of each of the spindles P within an upper recessed portion of the sleeve V is provided with a pinion $V^{\times}$, adapted to be engaged by a sliding rack B′, which enters at one side of said recessed portion, the rack being of such width that the pinion in its rising and falling movements with the spindle is always meshed therewith, so that the spindle will at all times be actuated by the motions of said rack. The rack is pivotally connected with an arm C′ which is pivotally connected with a lever D′ having its lower end working in a slot or recess E′, shaped as shown, (see Figs. 1 and 12) of a wheel F′ on the shaft E, the rotation of the pulley thus causing the reciprocating movements of the racks B′, and thereby the oscillations of the spindles P, with their capping-irons. The shape of the slot E′ determines the movements of the racks.

Journaled on an attachment of the frame A is a shaft G′, having a ratchet wheel H′ loosely mounted thereon and secured to the loose member J′ of a clutch mechanism. On the said shaft are secured the wheels L′ having their peripheries concave and knurled, forming passage-ways for the wire solder which is drawn from the rotatable spools M′ on spindles on the side frame N′, and fed through the guides P′, P′, and pipes Q′ to the capping irons. The pivoted tension levers R′ R′, have their lower end rollers adapted to bear against the wire and are connected at their upper ends by the spring S′.

To stop the operation or feeding of the wire solder when a tray is not beneath the capping-iron, so that the wire will not be wasted, the following described shifting mechanism for the said purpose is employed: A shaft T′ suitably journaled in the frame A, carries at one end a weighted arm U′ having one of its ends held down by a tray when the same is beneath the capping-iron, so as to hold in position a bent arm V′, which is on the said shaft, and adapted to laterally move the fast member W′ of the clutch into engagement with the loose member and the ratchet wheel H′, and thereby cause a revolution of the wheels L′, and thus a feeding of the wire solder. When the tray is removed from the end of the arm U′, so that said end is not held down thereby, the weighted end causes the shaft T′ to partially rotate, causing the bent arm U′ to release the fast member W′ of the clutch from the loose member thereof, so that the ratchet-wheel H′ is free to revolve on the shaft G′ without rotating the latter, and thereby the wheels L′, and causing the wire solder to be drawn from the spools. The ratchet-wheel is operated by a pawl $Q^2$, connected with the rising and falling rod $R^2$, which is operated by the cam $R^3$ on the shaft E.

To cleanse the top of the can and cap, so that the solder will readily flow thereon, as well as adhere thereto, a bath of solder, flux, or any suitable acid—such as muriatic and zinc—is spread upon the surface of the same by the oscillating brushes X′, X′, which are secured to the oscillating arms Y′, Y′, attached at their inner ends to the collar Z′ on the tube or pipe S.

The supply-tank $A^2$ is suitably supported on an attachment of the upper part of the frame A and provided with downward-projecting outlet-pipes $B^2$, $B^2$, leading from the upper part of a chamber $C^2$ of the tank, the said chamber communicating at its lower end with the main portion of the tank. The acid is raised from the said chamber by a plunger $D^2$, which has the openings $D^3$ in its head, through which the acid passes, and around the upper edges of said openings are flanges, between which and the walls of the chamber $C^2$ a portion of the acid raised or lifted by the upward movement of the plunger is kept from flowing back through the openings $D^3$ until it can escape by the discharge-outlets $B^2$, and thence into the hollow handles of the brushes X′, and thus upon the bristles or wiping portion of each brush. The upper portion of each handle has a funnel-shaped attachment $F^3$ secured thereto, which catches any drip of the discharge-pipe when the hollow handles of the brushes are inclined and not in line with the lower ends of the outlet-tubes. The plunger $D^2$ is operated by means of the rod $F^2$, which is connected by the arm $H^2$ with the plunger, and has on its lower end an arm $H^3$, adapted to ride upon the cam $G^2$ on the shaft E.

The lower end of the central tube S is provided with burners $W^2$ in close proximity to the capping-irons, so as to readily heat the same, and its upper end is connected by any flexible hose with a gas-supply, so that it may serve not only as a support for the capping-irons, but as a heater for the same.

$J^2$ designates a pipe, which is secured to the frame of the machine and leads from a cold-blast supply to the vicinity of the capping-irons, so as to direct a cold blast on the top of the cans when the capping-irons are raised therefrom. The said pipe is provided with a valve $K^2$, which is opened and closed by a lever $L^2$, connected therewith and having its lower end adapted to ride on a cam $M^2$ of the wheel F′.

The operation of the machine is as follows:—The trays C, with the cans thereon, are placed on the tables B and the caps placed thereon. The shaft E is rotated, and, owing to the cam H and the spring $N^2$, the lever J is moved, so that the levers K and L are placed in such position that the lever L will engage the first projection G on the tray and move the same until the first set or four of the cans are beneath the capping-irons. During this movement the rotation of the cam Y on the shaft E lowers the rod X and the lever U with the central tube and capping-irons, so that when the cans are beneath the irons, the weighted tip-rods A′ rest upon the caps holding them in place. The brushes X′, X′, which during this portion of the rotation of the shaft E were in line with the tops of the caps and brushed the same, are now raised by the depression of the ends of the levers Y′, which are connected with the central tube S, so as to be clear of the said caps. The rotation of the shaft E with the cam $R^3$, causes a step-by-step rotation of the shaft G′, so that the wire solder is fed to the heated capping-irons, which are rotated, owing to their pinions and the movement of the rack mechanism caused by the lever D′, having its lower end moving in the groove portion of the periphery of the wheel F′, so that the melted solder is carried so as to enter all portions of the groove on the top of the can, and in which the edges of the cap are seated. A further rotation of the shaft E and the cams still further raises the capping-irons, so that they are clear of the cans, when the lower end of the pivoted lever $L^2$, riding on the cam portion $M^2$ of the wheel F′, opens the valve $K^2$, whereby a cold blast is directed on the hot melted solder, solidifying and cooling the same. A further rotation of the shaft raises the irons, and with them the tip-rods, so that the latter are freed from the cans and the said cans are free to be moved. As the shaft further rotates, the valve $K^2$ is closed and the tube S, with the irons, lowered for another operation. The levers K and L are also moved in such position that the lever K engages the first projection on the tray, and as it moves, draws the same until the second set of cans is beneath the capping-irons, when the operation of the parts is similar to that already described. The next movement of the levers engages the same lever K with the second projection G, moving the tray until the third set of cans is beneath the irons, the operation of the parts then being as before described. A further movement of the levers engages the lever L with the first projection of the second tray and draws the same underneath the can, the lever L, however, during a portion of the movement engaging the third projection of the first tray and drawing the same so as to prevent a bumping or jarring action of the trays.

To render the acid-feed intermittent in its action, and prevent its operation when the cans are not on the trays, I construct the rod $F^2$ of right and left screw-thread sections having a connecting collar $F^3$, with an arm $G^3$, adapted to contact with a can and move said collar, so as to shorten the rod. A spring $J^3$, fastened to the arm $G^3$ and frame, serves to restore the arm $G^3$ to its normal position when no can is in the way, thereby lengthening the rod $F^2$, so that the plunger-head $D^2$ will not raise the acid to the overflow $B^2$.

Having thus described my invention, what I claim as new, and desire to secure by Letters Patent, is:—

1. A can-capping machine having a table, a cam thereon, a pivoted lever, and two operating-levers connected with said pivoted lever for moving the trays, said parts being combined substantially as described.

2. The combination of a rotary shaft with a cam thereon, a pivoted lever held against said cam, and two weighted levers pivoted to the first-mentioned pivoted lever at different distances from its pivotal connection, and having engaging or operating ends adapted to travel in the same plane, substantially as and for the purpose described.

3. The combination of a rotary shaft with a cam thereon, a pivoted lever held against said cam, two weighted levers having engaging ends and pivoted to the first lever at different distances from its pivotal connection, and can-trays with projections, substantially as and for the purpose described.

4. In a can-capping machine, an automatic solder-feeding device, an automatic acid-feeding device, a tube having burners therein, a rotary capping-iron having a swivel-connection with hollow spindles supported by said tube, and a rise-and-fall movement, and mechanism for operating said parts at proper time, said parts being combined substantially as described.

5. In a can-capping machine, the combination of a tube having burners thereon, a rotary capping-iron having a swivel-connection with hollow spindles supported by said tube, and a rise-and-fall movement, a rotary spool adapted to hold wire-solder thereon, a tubular guide leading from said rotary spool to the capping-iron, a rotary wheel having a concave periphery adapted to contact with the wire and advance the same through the tubular guide toward the iron, and mechanism intimately connecting, controlling, and operating said parts, substantially as described.

6. The combination of a main driving-shaft with a cam thereon, a rotary capping-iron, a rotatable spool adapted to hold wire-solder thereon, a guide leading from the spool to the capping-iron, a shaft with a wheel thereon, the latter having a periphery adapted to engage the soldering-wire, a clutch mechanism on said shaft, a ratchet-wheel mounted on said shaft, and operated by a pawl raised and lowered by the said cam, and mechanism for operating said clutch, substantially as described.

7. The combination of a main driving-shaft with a cam thereon, a rod with pawl operated by the rotation of said cam, a rotary capping-iron, a guiding device, a shaft with a wheel thereon adapted to contact with and when rotated to advance the soldering-wire to said capping-iron, a ratchet-wheel with a clutch on said shaft, and mechanism, substantially as described, operated by the can-tray for engaging the ratchet and wheel on said shaft, substantially as and for the purpose described.

8. In a can-capping machine, a can-carrier, a tank with discharge-ports in said tank, a plunger, a sectional rod adjustable in length connected with said plunger, mechanism substantially as described, connected with said rod and adapted to contact with a cam on said carrier for shortening said rod, and a spring connected with said shortening mechanism and the frame of the machine for lengthening said rod, said parts being combined substantially as described.

9. A can-carrier, an acid-tank with discharge-pipe, a plunger with head in said tank, a sectional rod having screw-threaded ends connected by a collar, and an arm secured to said collar and adapted to contact with a can on said carrier and thereby shorten said rod, so that said plunger will cause the acid to be discharged from said tank, said parts being combined substantially as described.

10. The combination of a stationary frame, an arm pivoted thereto and carrying on one end a hollow-handle brush, a tube or rod vertically movable in said frame and having the other end of the arm pivoted thereto, a rising and falling rod with an arm and plunger secured thereto, and an acid-supply tank with discharge or outlet pipe, the top or opening in the handle of the brush being below the end of the outlet-pipe, and the said plunger lifting the acid to said outlet-pipe, substantially as and for the purpose described.

11. In a can-capping machine, a tank having a chamber therein communicating with the body of the tank at its lower end, a downwardly-projecting pipe leading from the upper part of said chamber, a plunger having openings in its head with flanges surrounding the top edges thereof, and a hollow brush connected to an oscillating arm, said parts being combined substantially as described.

12. In a can-capping machine, the combination of a tank with overflow, a plunger with rod, a shaft with a cam thereon, the said plunger-rod being in sections, each with screw-threads on its adjacent ends, and a collar embracing said ends and provided with an operating-arm, substantially as described.

13. A can-capping machine consisting of a frame, a can-carrier with operating mechanism comprising a table and trays, a cam thereon, a pivoted lever, and two operating-levers connected with said pivoted lever for moving the trays, a gas-supply tube with burners, capping-irons supported by said supply-tube and having oscillating mechanism supported thereby and operated from the main driving-shaft, an automatic intermittent acid-supplying device, an automatic solder-supplying device, mechanism, substantially as described for raising said supply-tube, and a cold-blast supply with intermittently-operated valve, substantially as described.

GEORGE E. LOCKWOOD.

Witnesses:
JOHN A. WIEDERSHEIM,
A. P. JENNINGS.